(12) United States Patent
Nicoloff et al.

(10) Patent No.: US 10,042,360 B2
(45) Date of Patent: Aug. 7, 2018

(54) UNMANNED AIRCRAFT TURN AND APPROACH SYSTEM

(71) Applicant: AeroVironment, Inc., Simi Valley, CA (US)

(72) Inventors: William J. Nicoloff, Camarillo, CA (US); Eric M. Sornborger, Los Angeles, CA (US); Lars B. Cremean, Newbury Park, CA (US)

(73) Assignee: AeroVironment, Inc., Simi Valley, CA (US)

( * ) Notice: Subject to any disclaimer, the term of this patent is extended or adjusted under 35 U.S.C. 154(b) by 0 days.

(21) Appl. No.: 15/355,014

(22) Filed: Nov. 17, 2016

(65) Prior Publication Data

US 2017/0139416 A1 May 18, 2017

Related U.S. Application Data

(60) Provisional application No. 62/257,206, filed on Nov. 18, 2015.

(51) Int. Cl.
| | | |
|---|---|---|
| *G05D 1/00* | (2006.01) | |
| *B64C 39/02* | (2006.01) | |
| *B64D 47/08* | (2006.01) | |
| *B64C 9/00* | (2006.01) | |
| *F41G 7/22* | (2006.01) | |
| *F41G 7/30* | (2006.01) | |

(52) U.S. Cl.
CPC ............ *G05D 1/0094* (2013.01); *B64C 9/00* (2013.01); *B64C 39/024* (2013.01); *B64D 47/08* (2013.01); *F41G 7/2253* (2013.01); *F41G 7/2293* (2013.01); *F41G 7/30* (2013.01)

(58) Field of Classification Search
USPC .............................................. 701/3
See application file for complete search history.

(56) References Cited

U.S. PATENT DOCUMENTS

| | | | |
|---|---|---|---|
| 9,367,067 B2* | 6/2016 | Gilmore ................. G05D 1/101 |
| 9,549,125 B1* | 1/2017 | Goyal ................ H04N 21/4728 |
| 9,641,810 B2* | 5/2017 | Zufferey ................ H04N 7/183 |
| 2009/0181736 A1* | 7/2009 | Haigh-Hutchinson . A63F 13/10 463/2 |
| 2009/0187299 A1* | 7/2009 | Fregene ............... G05D 1/0094 701/23 |
| 2010/0042269 A1* | 2/2010 | Kokkeby .............. G01S 3/7864 701/3 |
| 2010/0117870 A1* | 5/2010 | Maris ........................ F41G 3/02 340/995.28 |
| 2010/0198514 A1* | 8/2010 | Miralles .................. F41G 7/008 701/302 |

(Continued)

*Primary Examiner* — Tyler Paige
(74) *Attorney, Agent, or Firm* — Eric J. Aagaard, Esq.; The Law Office of John A. Griecci (57) ABSTRACT

An aircraft including a wing system, a plurality of control surfaces, a camera mounted on a camera pod, and a control system. The camera pod is configured to vary the orientation of the camera field of view only in yaw, relative to the aircraft, between a directly forward-looking orientation and a side-looking orientation. The control system controls the control surfaces such that they induce a significant aircraft yaw causing an identified target to be within the field of view of the camera with the camera in the directly forward-looking orientation.

7 Claims, 12 Drawing Sheets

(56) References Cited

U.S. PATENT DOCUMENTS

| | | | | |
|---|---|---|---|---|
| 2011/0228047 A1* | 9/2011 | Markham | .......... | H04N 13/0221 |
| | | | | 348/43 |
| 2012/0232717 A1* | 9/2012 | Koppie | .................. | G01S 17/42 |
| | | | | 701/2 |
| 2013/0048792 A1* | 2/2013 | Szarek | ................. | B64C 39/024 |
| | | | | 244/175 |
| 2014/0192193 A1* | 7/2014 | Zufferey | ............. | G05D 1/0094 |
| | | | | 348/144 |
| 2014/0297067 A1* | 10/2014 | Malay | .................... | G01C 9/005 |
| | | | | 701/4 |
| 2017/0031369 A1* | 2/2017 | Liu | ....................... | G05D 1/102 |
| 2017/0139416 A1* | 5/2017 | Nicoloff | .............. | G05D 1/0094 |
| 2017/0160751 A1* | 6/2017 | Pierce | ................... | G05D 1/101 |

\* cited by examiner

UNMANNED AIRCRAFT TURN AND APPROACH SYSTEM

This application claims the benefit of U.S. Provisional Application No. 62/257,206, filed Nov. 18, 2015, which is incorporated herein by reference for all purposes.

The present invention relates generally to an unmanned aircraft control system providing the ability to turn and approach a target without losing a positive identification of the target.

BACKGROUND OF THE INVENTION

The use of unmanned aerial vehicles ("UAVs") for delivering munitions to a target is known. In some cases, these UAVs are configured as remotely controlled missiles, in that they are configured to detonate upon reaching the target. Because these are typically limited-use or single-use devices, the cost of each UAV is a critical design parameter.

For large single-use UAVs, the cost, size and weight of a guidance system component such as a camera on a two-dimensional gimbal may not be very significant. However, for very small UAVs, the cost, size and weight of such a system component can be very significant. Thus, very small UAVs must be designed with minimal complexity in their systems.

Modern rules of engagement may require that a positive identification ("PID") of a target be established prior to initiating an attack while used within theatres of operation that may contain civilians. Typically, the PID must be maintained from a time prior to an activity that commits to the initiation of the attack, throughout a terminal phase of the attack. Additionally, in such theaters modern rules of engagement may require that a potential target be established as a legitimate target prior to reaching a wave-off requirement, i.e., a period of time (e.g., 5 seconds) prior to completing the attack.

Figure 1A:
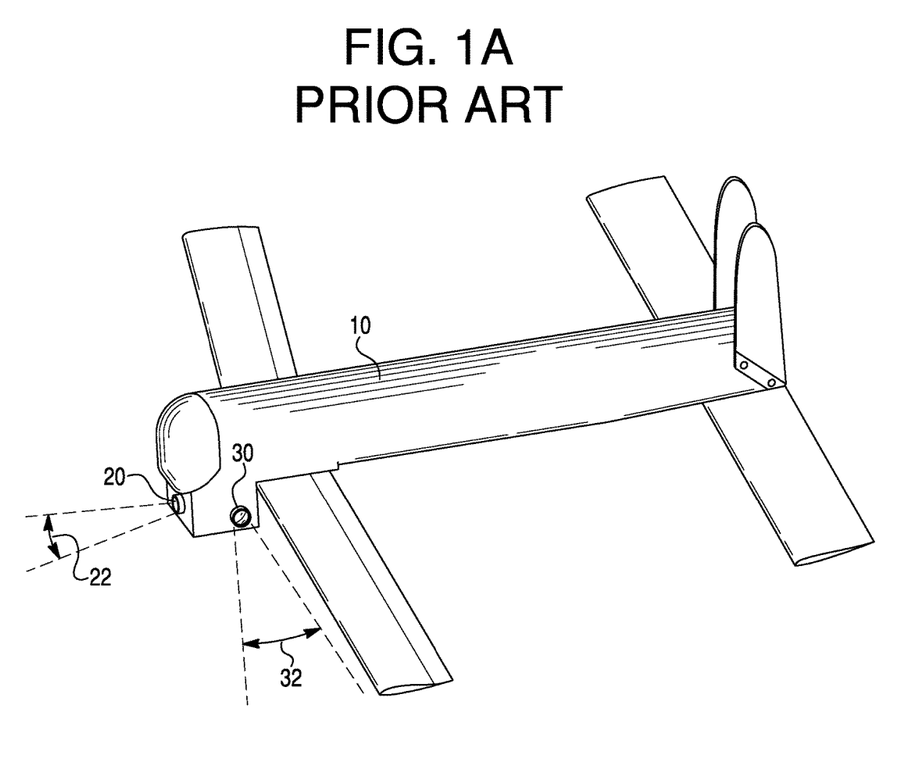
FIG. 1A is a perspective view of a prior art small, unmanned, weaponized aircraft.
Figure 1B:
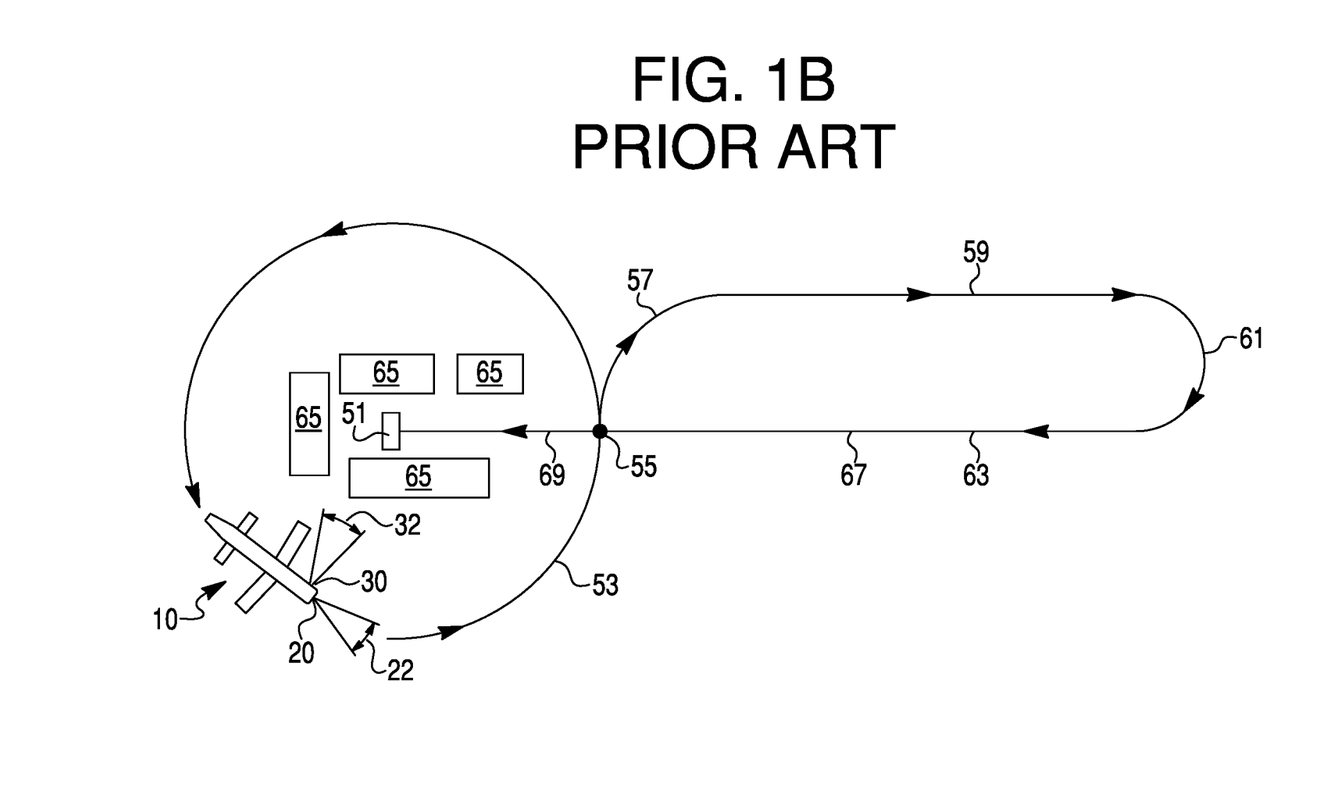
FIG. 1B is a prior art target-approach maneuver.

With reference to FIGS. 1A and 1B, a remotely controlled aircraft 10 that is equipped with a forward-looking camera 20, a side-looking camera 30 and an integrated explosive. The forward-looking camera 20 has a limited forward field of view 22 and a separate side field of view 32 is provided by the side-looking camera 30. This configuration provides for the aircraft to first locate a potential target 51, and then loiter in a pattern 53 around the target until an operator/pilot of the aircraft establishes that the aircraft has a PID on a target that is a legitimate target. As shown in FIG. 1B, one loitering technique is to fly the aircraft 10 in a geometric pattern (e.g., a circle) around the potential target until the legitimacy of the target 51 is established. In doing so, the side-view camera 30 maintains a continuous view of the potential target within its field of view 32, and therefore it maintains a PID on the potential target so long as there are no obstructions. The velocity vector is roughly 90° off of the direction towards the target. The pattern 53 may be flown at a higher altitude than that of the glide path of an attack on the target.

In a target-approach maneuver, when the legitimacy of the target is established, the aircraft operator commits to the action at a ground commit-location 55 (a spot on the ground under the location where commit action was done), and flies an approximately 90° turn 57 to fly outbound, away from the target (on an outbound leg 59), for an appropriate distance. During this portion of the flight, the altitude may be reduced. The aircraft then flies a 180° turn 61 to fly inbound toward the target on an inbound leg 63.

The 90° turn 57 is not as tight as the 180° turn 61 (i.e., the radius of the 180° turn has a smaller radius). This places the ground commit-location 55 in which the 90° turn was initiated between the ground locations of the aircraft and the target 51. Thus, on the inbound leg, the aircraft returns to the ground commit-location 55 over which it initiated the 90° turn, having a velocity vector that is toward the target rather than roughly 90° off of that direction. This can be accomplished using inertial navigation and/or GPS. The inbound leg 63 includes an initial approach 67 leading from the 180° turn 61 to the ground commit-location 55, and a final approach 69 leading from the ground commit-location 55 to the target 51.

Because the aircraft loses sight of the target 51 throughout a portion of this outbound-and-inbound maneuver, the aircraft must reestablish PID on the target once it is visible in the forward-facing camera 20. Because PID is lost during these maneuvers, the aircraft operator must then reestablish that the target is the previously identified legitimate target.

This outbound-and-inbound maneuver provides a number of advantages. First, it allows for the aircraft altitude to be reduced to a preferable glide path on both the outbound leg and the inbound leg. Second, it provides for the aircraft's velocity vector to be turned toward the target. Third, it provides for a longer approach to the target, and therefore more time for the operator to reestablish that the target is a legitimate target. Fourth, it allows for an attack through a narrow window of attack vectors, such as could occur when the target is located around or between tall buildings 65.

Nevertheless, it also has drawbacks, in that requires a substantial amount of time to complete, and that it places the aircraft over more terrain at reduced altitudes. This potentially allows observers in the area, to detect the aircraft and raise the alarm. Moreover, the time for this extended maneuver allows time for a mobile target to depart, even if the aircraft is not detected. Also, after the PID is lost on the outbound leg, the legitimacy of the target must be reestablished on the inbound leg, raising the possibility that the legitimacy might not be reestablished prior to having to abort the attack.

It should be noted that in FIG. 1B, the sizes of the various portions of the flight paths, and the sizes of the aircraft 10, target 51 and obstructions 65, are not necessarily representative of actual conditions. Rather, they are sized to clearly illustrate the concepts of the maneuver.

Accordingly, there has existed a need for an armed aircraft that is loitering around a target to be able to reduce its altitude to the level of a preferable glidepath, turn its velocity vector toward the target, and not lose time reestablishing that the target is legitimate, all while not incurring significant risk of exposure. Preferred embodiments of the present invention satisfy these and other needs, and provide further related advantages.

SUMMARY OF THE INVENTION

In various embodiments, the present invention solves some or all of the needs mentioned above, providing a small unmanned armed aircraft system that is able to turn its velocity vector toward a target while not losing a positive identification ("PID") of the target while it is flying past or loitering around the target.

The unmanned aircraft system includes an aircraft including a wing system, a plurality of control surfaces, a camera on a camera pod, and a control system. The wing system is configured to carry the majority of the aircraft weight when in flight. The plurality of control surfaces is configured to control aircraft pitch, aircraft roll and aircraft yaw in flight. The camera is characterized by a field of view, and is mounted on the camera pod. The camera pod is configured to vary the orientation of the camera field of view only in yaw, relative to the aircraft, between a directly forward-looking orientation and a side-looking orientation.

Advantageously, when the camera is in an at least partially side-looking orientation and observing an identified target, the control system is configured to control the control surfaces, and further configured to control the camera pod to change the camera position in yaw relative to the aircraft so as to maintain a PID on the target. Using this system, the camera may maintain the PID of the target while the aircraft turns its flight vector toward the target.

Under a further feature of the invention, the control system controls the control surfaces such that they induce a significant aircraft yaw causing the identified target to be within the field of view of the camera with the camera in the directly forward-looking orientation. Advantageously, this allows the aircraft to roll significantly more than the field of view would allow without the camera being in the directly forward-looking orientation, providing for a sharper turn.

Other features and advantages of the invention will become apparent from the following detailed description of the preferred embodiments, taken with the accompanying drawings, which illustrate, by way of example, the principles of the invention. The detailed description of particular preferred embodiments, as set out below to enable one to build and use an embodiment of the invention, are not intended to limit the enumerated claims, but rather, they are intended to serve as particular examples of the claimed invention.

DETAILED DESCRIPTION OF THE PREFERRED EMBODIMENTS

The invention summarized above and defined by the enumerated claims may be better understood by referring to the following detailed description, which should be read with the accompanying drawings. This detailed description of particular preferred embodiments of the invention, set out below to enable one to build and use particular implementations of the invention, is not intended to limit the enumerated claims, but rather, it is intended to provide particular examples of them.

With reference to FIGS. 2-5, typical embodiments of the present invention reside in very small, weaponized, human-portable unmanned aircraft systems. One embodiment of an unmanned aircraft system under the invention includes an unmanned aircraft 101, a remote-control station 103 (typically a ground station), and a launch tube 105. The aircraft is configured as a remotely controlled missile, in that it is configured to detonate as a weapon upon reaching a target, destroying the aircraft and damaging or destroying the target. It is therefore a limited-use or single-use or aircraft, and thus the cost of the aircraft is a critical design parameter.

Unmanned Aircraft

Figure 2:
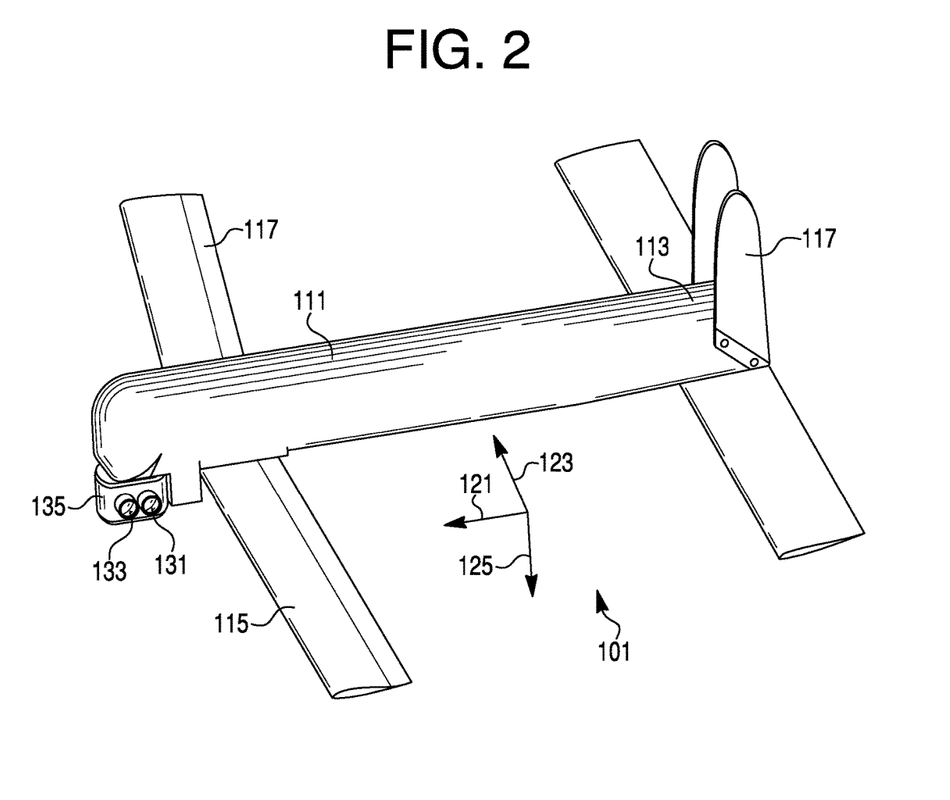
FIG. 2 is a perspective view of a small, unmanned, weaponized aircraft that is part of an aircraft system embodying the invention.
Figure 5:
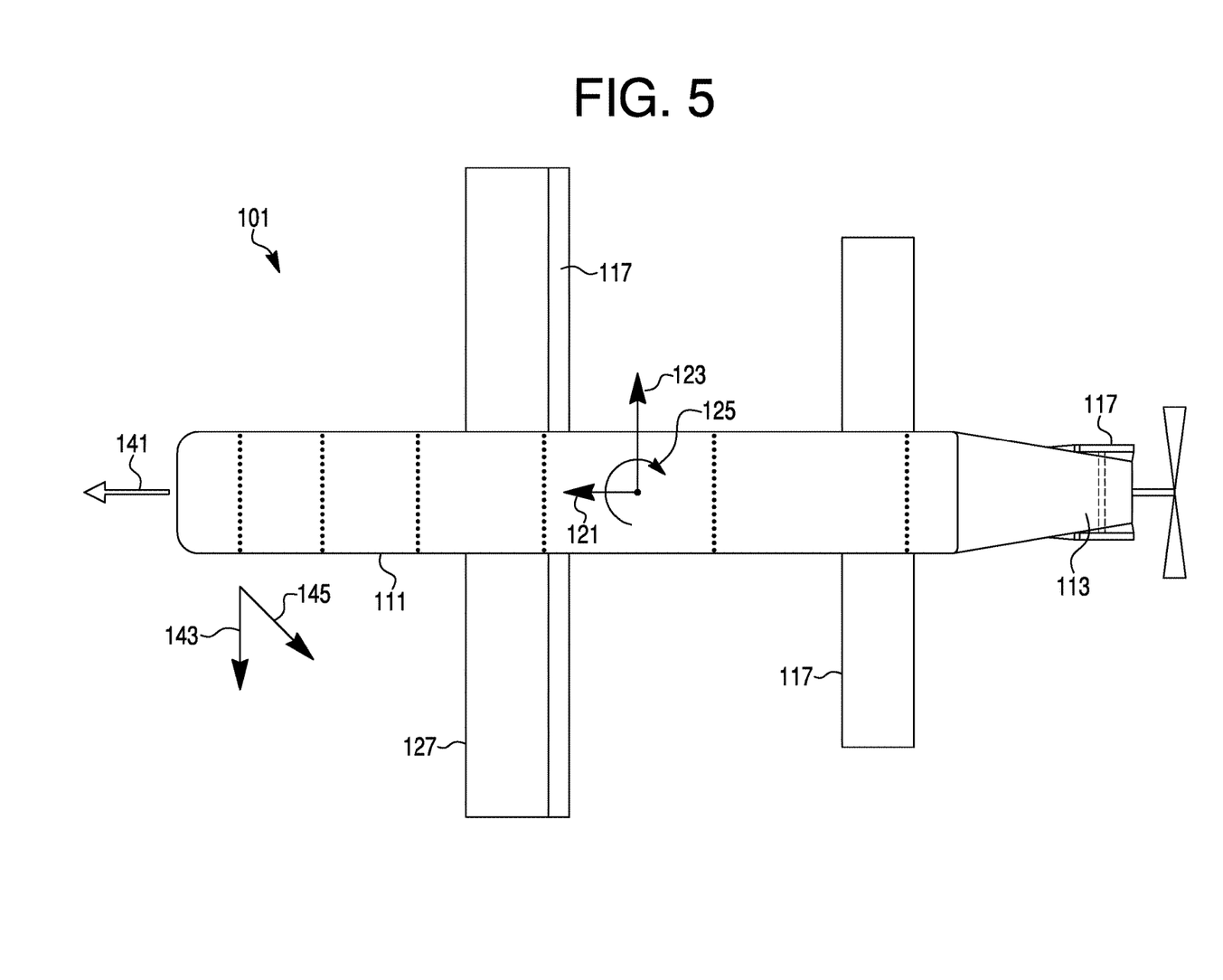
FIG. 5 is a top view of the aircraft depicted in FIG. 2.

The aircraft 101 includes a fuselage 111, an empennage 113, and a wing system including a main wing 115 configured to carry a significant portion of (and often the majority of) the aircraft weight when in flight. The wing and empennage are provided with a plurality of control surfaces 117 configured to control aircraft pitch, aircraft roll and aircraft yaw while in flight.

The aircraft 101 is characterized by a roll axis 121, a pitch axis 123 and a yaw axis 125. As is known in the art, the roll axis defines direct forward-looking and aft-looking directions, the pitch axis defines direct port and starboard side-looking directions, and the yaw axis defines direct upward-looking and downward-looking directions.

Launch System

With reference to FIGS. 2, 4, 6 and 7, the aircraft empennage 113 and main wing 115 flight surfaces 117 (including the control surfaces) are configured to rotate such that they rotate relative to the fuselage 111 between a retracted position (see, FIGS. 6 and 7) and a flight position (see FIG. 2). With the empennage and main wing in the retracted position, the aircraft 101 can be placed within the launch tube 105.

Figure 6:
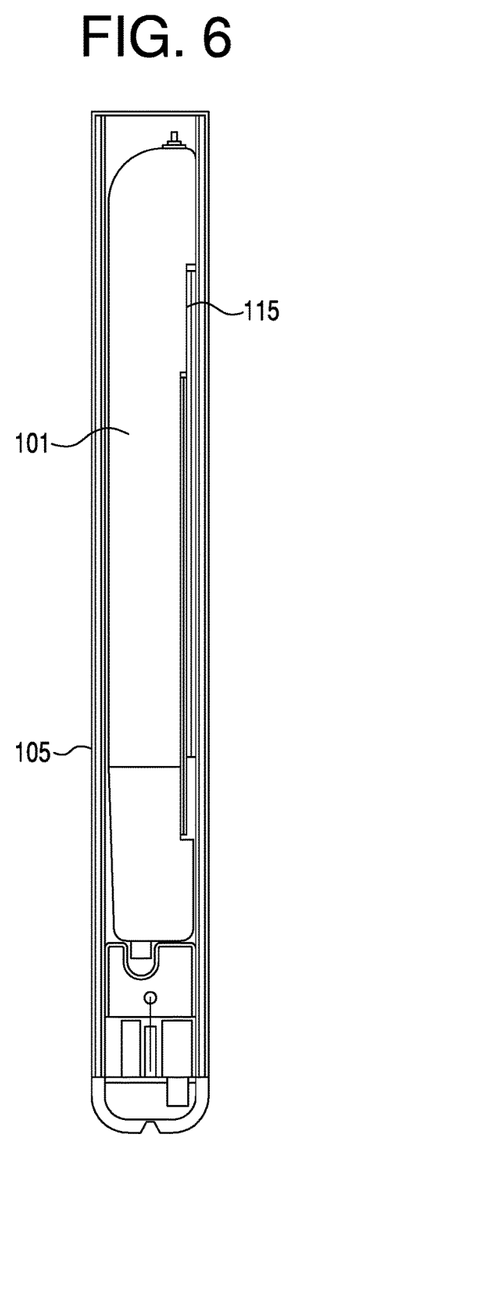
FIG. 6 is a cross-sectional view of the aircraft depicted in FIG. 2 loaded into the launch tube depicted in FIG. 4.
Figure 7:
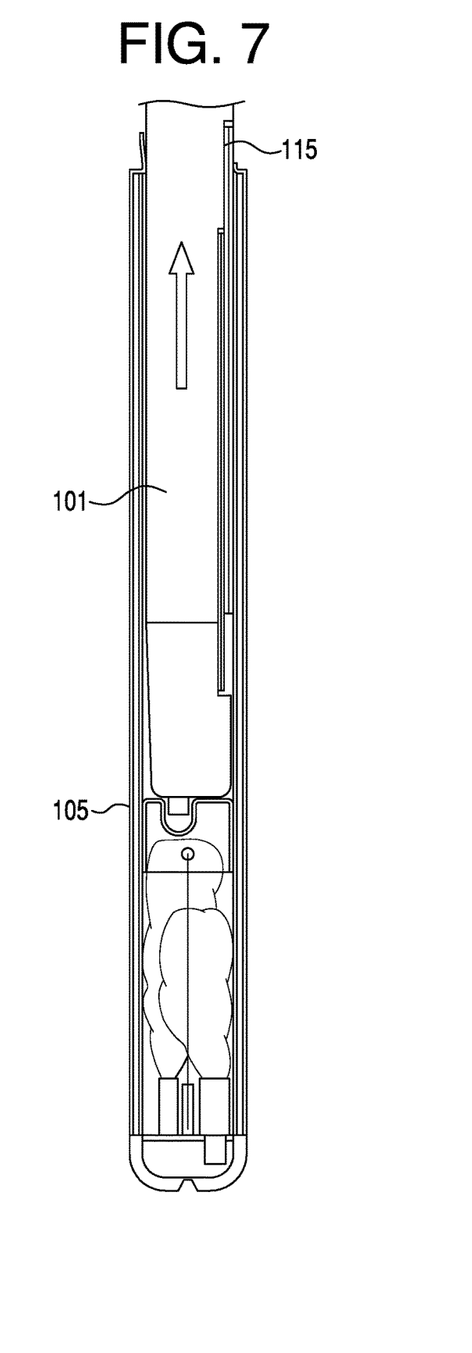
FIG. 7 is a cross-sectional view of the aircraft depicted in FIG. 2 being launched from launch tube depicted in FIG. 4.

To launch the aircraft 101 into flight, the aircraft is explosively ejected from the launch tube 105 (see FIGS. 6 and 7). After the aircraft leaves the launch tube, the main wing 115 and empennage 113 are extended to their flight positions. The explosive launch of the aircraft subjects all components of the aircraft to high g-force levels. Therefore, all components of the aircraft must be adequately robust to survive the launch.

Camera System

Figure 8:
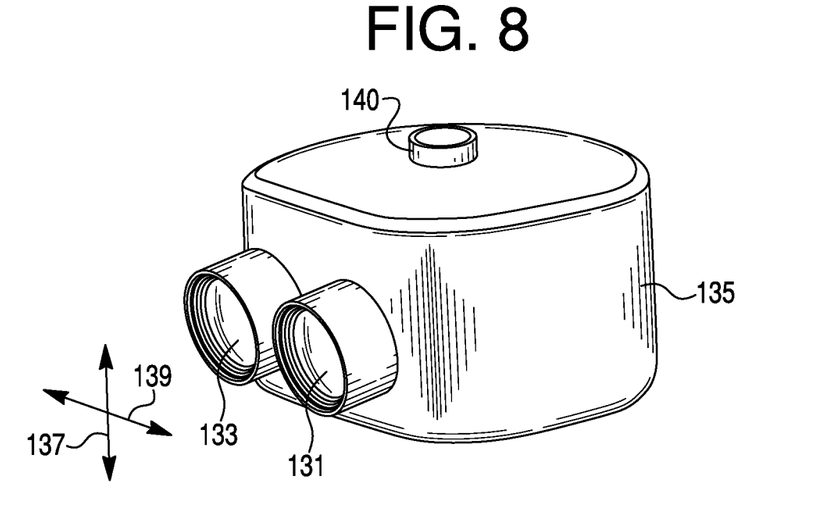
FIG. 8 is a perspective view of a camera pod that is part of the aircraft depicted in FIG. 2.

With reference to FIGS. 2, 5 and 8, mounted on the fuselage 111 is a camera system having at least one camera, and typically including a pair of cameras, including a visual (EO) camera 131 and an infrared (IR) camera 133 mounted on a camera pod 135. Each camera is characterized by a field of view 136, which typically will be the same size or larger in a vertical dimension 137 than in a lateral dimension 139 (i.e., it is in a portrait orientation rather than a landscape orientation). The camera pod has only a single gimbal 140, and is configured to vary the orientation of the camera field of view only in yaw relative to the aircraft 101.

Figure 9:
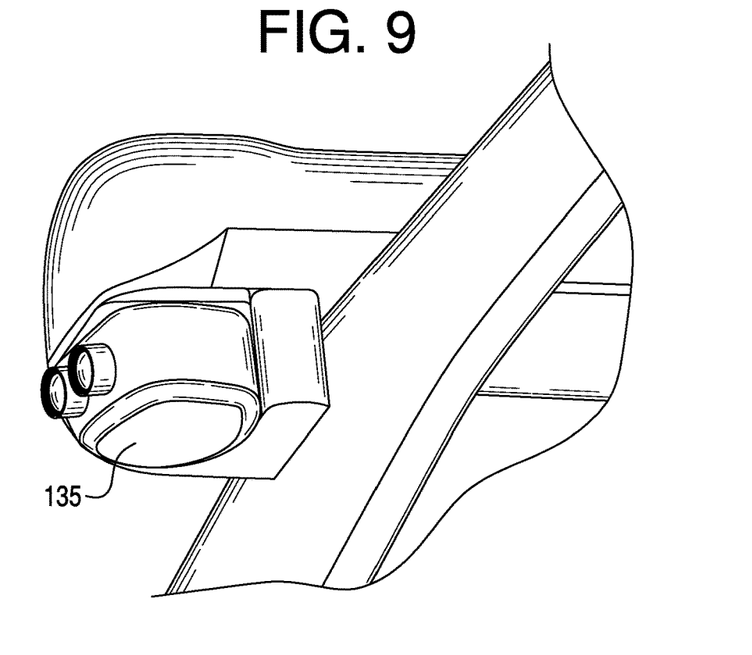
FIG. 9 is a perspective view of the camera pod depicted in FIG. 8, set in a forward looking orientation on the aircraft depicted in FIG. 2.
Figure 10:
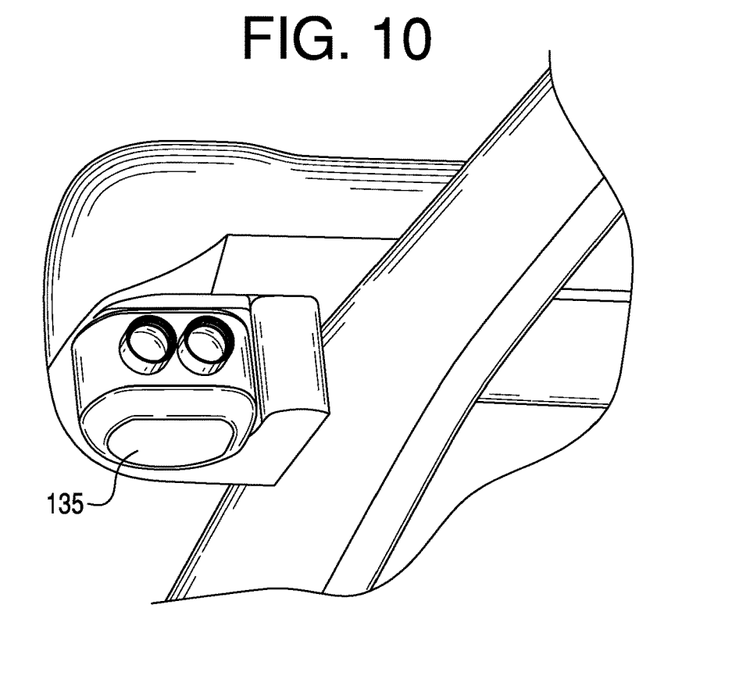
FIG. 10 is a perspective view of the camera pod depicted in FIG. 8, set in a side looking orientation on the aircraft depicted in FIG. 2.

The camera pod 135 can rotate both the EO camera 131 and the IR camera 133 in yaw, relative to the aircraft, looking at least between a directly forward-looking orientation 141 (i.e., in the direct forward-looking direction depicted in FIG. 9), and a directly side-looking orientation 143 (i.e., in one of the direct side-looking directions, such as one depicted in FIG. 10). Optionally, the camera may be able to rotate the camera in yaw further, such as to orient the camera 45° aft 145 of the directly side-looking orientation to an aft-looking orientation 143.

Figure 11:
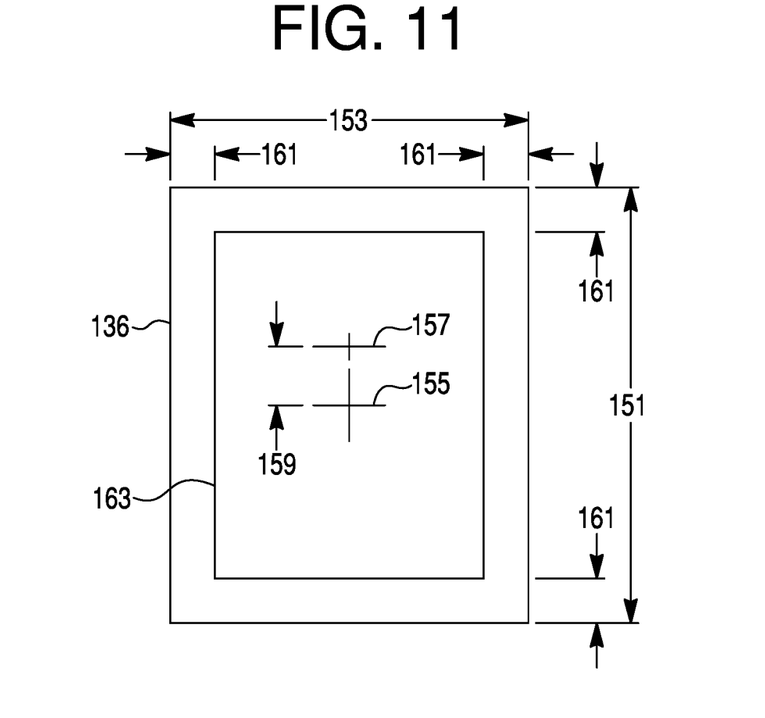
FIG. 11 is a depiction of a field of view of a camera on the camera pod depicted in FIG. 8.

With reference to FIGS. 8 and 11, an exemplary EO camera might have a vertical field of view 151 of 60° in the vertical dimension 137, and a lateral field of view 153 of approximately 40° in the lateral dimension 139. Because the camera will generally be used for viewing the ground, its vertical center of view 155 might be angled downward from an aircraft lateral direction 157 (in level flight) by a downward-looking angle 159, such as of 8° or more. Also, to maintain a positive identification ("PID") of the target during turbulence, a safety margin 161 (typically of 5° to 10°) should be maintained between the target's location in the field of view and the edge of the field of view. This defines an EO camera usable field of view 163.

An exemplary IR camera might well have similar sizing, through not necessarily the exact same dimensions. It will have a vertical field of view in the vertical dimension, and a lateral field of view in the lateral dimension. It will have a center of vertical view angled downward from a camera vertical center view by a downward angle. To maintain PID during turbulence, a safety margin should be maintained between the target's location in the field of view and the edge of the field of view. Thus defining an IR camera usable field of view.

For either camera, when a PID of a target is established in the usable field of view (e.g., the EO camera usable field of view 163) with the camera in a side-looking yaw orientation with respect to the aircraft, the ability of the aircraft to roll without losing PID is limited by the usable field of view. More particularly, the aircraft cannot roll to turn toward the target any farther than the top of the usable field of view allows (or PID is lost). Likewise, the aircraft cannot roll to turn away from the target any farther than the bottom of the usable field of view allows (or PID is lost).

For either camera, when a PID of a target is established in the usable field of view (e.g., the EO camera usable field of view 163) with the camera in a forward-looking yaw orientation with respect to the aircraft, the ability of the aircraft to roll is not limited by the usable field of view so long as the target is within a safe roll zone of the field of view. The safe roll zone is the portion of the field of view in which objects stay in view regardless of the roll angle of the aircraft up to a maximum roll angle, such as up to ±90°. This will be affected by various parameters, such as the downward-looking angle 159 and the flight characteristics of the aircraft. For a given aircraft, this may be experimentally determined.

Remote-Control Station

Figure 3:
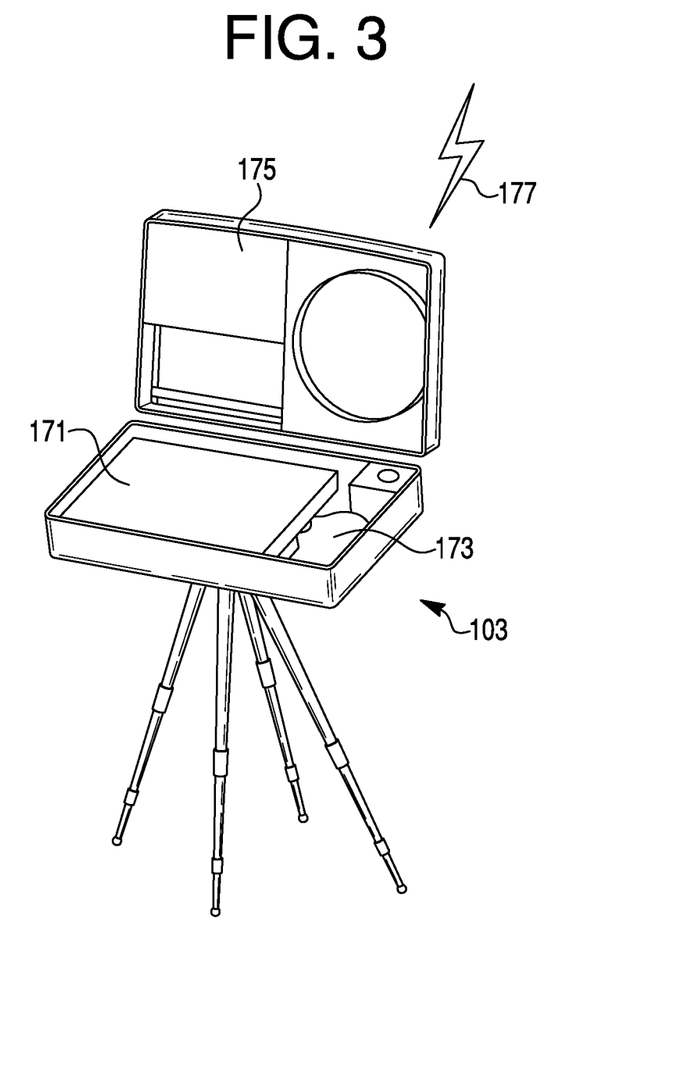
FIG. 3 is a remote-control station that is part of the aircraft system partially depicted in FIG. 2.
Figure 4:
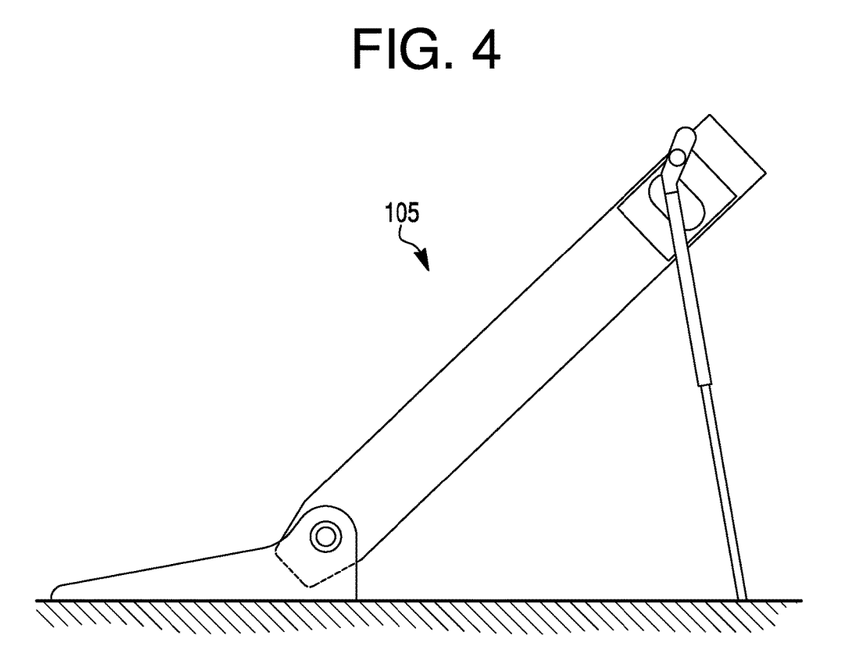
FIG. 4 is a launch tube that is part of the aircraft system partially depicted in FIG. 2.

With reference to FIG. 3, the aircraft system remote-control station 103 will typically, but not necessarily, be used by an operator/pilot on the ground (e.g., a ground station). Other possible operator/pilot locations include a boat or a plane.

The remote-control station 103 is configured for the operator to remotely control the aircraft. More particularly, the remote-control station includes a video monitor 171 (as is known for unmanned aircraft) for displaying both flight control information and a live video feed from the aircraft to provide for visual flight, particularly for when the aircraft is not in view of the user. The remote control station further has a manual controller 173 to control the various aircraft features and functions. Optionally, this controller may be of a type similar to those known for video gaming such that the operation of the aircraft 101 might be more quickly learned by operators familiar with video game controls.

To provide communication with the aircraft 101, the remote-control station 103 is provided with communication equipment 175 configured for the transmission and receipt of communication signals 177, and thus the remote-control station is provided with two-way communication with the aircraft. These communication signals may include flight control information and commands, and payload related signals.

Attack Vectors

Figure 12:
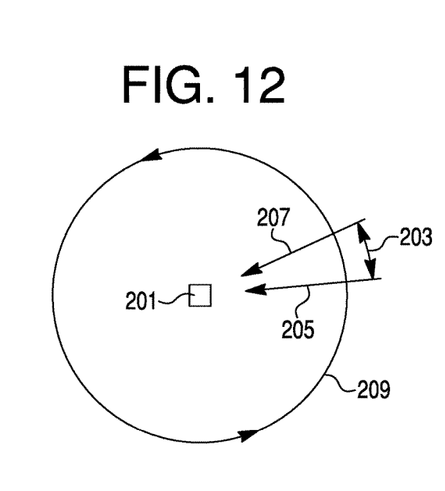
FIG. 12 is an aerial view depiction of a set of possible approach vectors for a target in a first location.
Figure 13:
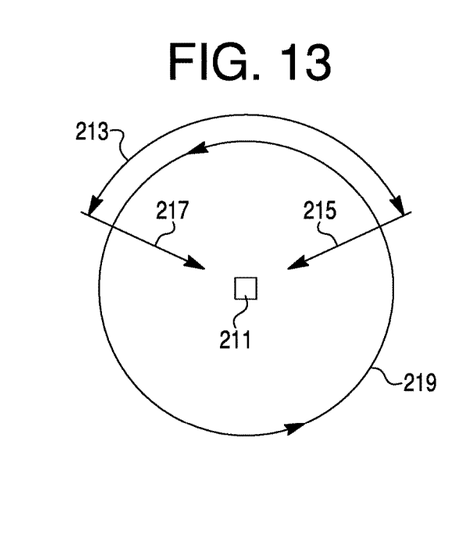
FIG. 13 is an aerial view depiction of a set of possible approach vectors for a target in a second location.
Figure 14:
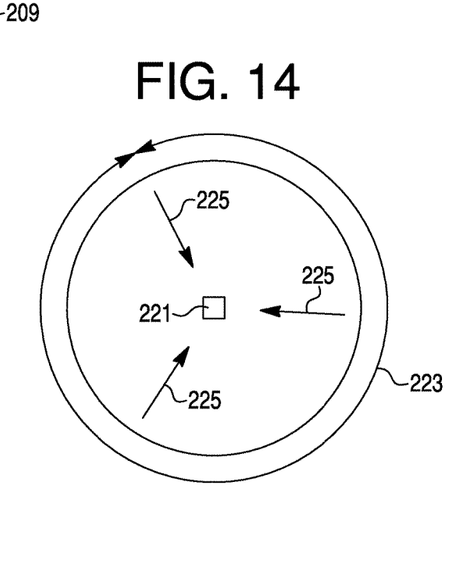
FIG. 14 is an aerial view depiction of a set of possible approach vectors for a target in a third location.

With reference to FIGS. 12-14, different target locations will be characterized by different windows of attack vectors. In some locations (see, e.g., FIG. 12), there may be many obstructions around a target 201, allowing for only a limited range 203 of attack vectors, extending from an initial attack vector 205 option to a final attack vector 207 option. It should be noted that the terms initial and final in this context respectively denote the first available attack vector (final approach vector) from a given pattern of loiter 209 in a given direction, and the last available attack vector from that pattern of loiter.

In other locations (see, e.g., FIG. 13), there may be some obstructions around a target 211, allowing for a much wider range 213 of attack vectors, extending from an initial attack vector 215 option to a final attack vector 217 option around a given pattern of loiter 219 in a given direction. In yet other locations (see, e.g., FIG. 14), there may be no obstructions around a target 221, allowing for a 360° range 223 of attack vectors 225 options. It should be noted that the shape of the loiter pattern might also limit the range of attack vectors. For example, the aircraft might have to avoid casting a shadow on the target, and thus it might fly too close to a target to set up an attack vector using a desired maneuver.

It should be noted that in the various figures depicting targets and flight paths in this detailed description, the sizes of the various portions of the flight paths, and the sizes of the targets and obstructions are not necessarily representative of actual conditions. Rather, they are sized to clearly illustrate the depicted concepts.

Automated Control System

Figure 15:
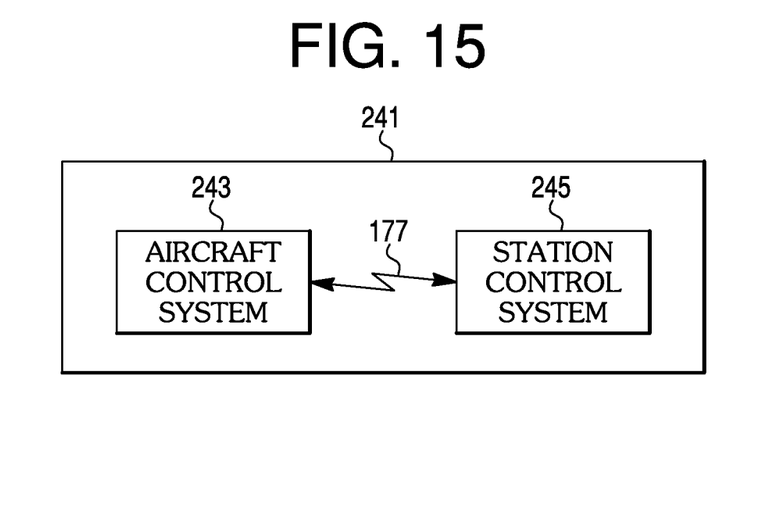
FIG. 15 is a schematic view of an automated control system that is part of the aircraft system partially depicted in FIG. 2.

With reference to FIGS. 2, 3 and 15, the aircraft system includes an automated control system 241 having both hardware and software, the hardware including a processor and computer memory. The automated control system includes an aircraft control system 243 on the aircraft 101, and a station control system 245 on the remote-control station 103.

The aircraft control system 243 is provided with wiring functionally linking the aircraft control system to servos configured to control the control surfaces 117, and is further provided with wiring functionally linking the aircraft control system to a servo configured to control the camera pod 135 so as to change the camera orientation in yaw relative to the aircraft.

To provide communication with the remote-control station 103, the aircraft 101 is provided with communication equipment configured for the transmission and receipt of the remote-control station communication signals 177. These communication signals may include flight control information and commands, and payload related signals.

The automated control system 241 provides an operator of the remote-control station 103 to manually control the aircraft 101, and further provides for various automated autopilot functions. Among these automated autopilot functions is a COMMIT function for use when a target is identified, typically with PID. The COMMIT function may be used when the camera pod 135 positions the camera 131 in an at least partially side-looking orientation (e.g., depicted in FIG. 10) and observing an identified target to the side of the aircraft and within the range of side looking angles that are within the yawing range of the camera pod. Also among the functions is an ABORT function, in which a COMMIT function is aborted and full control of the aircraft either returns to the operator or returns to a standard flight computer autopilot.

The COMMIT function causes the automated control system 241 to control the control surfaces, the camera system yaw servos and the payload (weapon) such that the aircraft is guided to the target and the payload is activated. The COMMIT function may be used in a variety of situations. In each of the situations, the operator of the remote-control station 105 has typically established a PID of a target that has been established as a legitimate target.

In a first situation, the aircraft 101 is circumnavigating an identified target in a pattern that might or might not be circular. In this situation, the camera pod 135 might not have to adjust the yaw of the camera system relative to the aircraft to keep the target within view prior to using the COMMIT function. In a second situation, the aircraft is flying past an identified target, possibly in a straight line. In this situation, the camera pod needs to continuously (or periodically) adjust the yaw of the camera system relative to the aircraft to keep the target within the usable field of view of at least one camera of the camera system. Similarly, in a third situation, if the aircraft was close to a target on the side of the aircraft (e.g., flying in a circle around the target or a straight line past the target), the aircraft could spiral radially outward relative to the target, allowing a PID while slightly increasing the approach distance and decreasing the altitude. A wide variety of other situations are also envisioned within the scope of the invention, such as spiraling inward toward a target.

The COMMIT function may include a variety of operational variations. At least some of these COMMIT function operational variations maintain the PID of the target throughout the flight to the target, and require no further participation by an operator.

Regardless of what operational variation is desired, prior to initiating the COMMIT function, the desired operational variation is selected, such as from a pull-down menu. Depending on the selected operational variation, some pre-COMMIT flight activities might be necessary. For example, some altitude may need to be reduced prior to doing certain operational variations. Also, some changes in airspeed may be necessary. To accommodate some maneuvers, it might be preferable to manually spiral outward or inward prior to initiating the COMMIT function. It should be noted that all of the described pre-COMMIT flight activities could be incorporated into a COMMIT function to create yet additional operational variations of the COMMIT function.

Once any pre-COMMIT activities are completed, the operator activates the COMMIT function on the remote-control station 105. At this point the automated control system takes control of the aircraft and guides it to the target. For many (though typically not all) COMMIT operational variations, this activity happens from beginning to end without losing PID, and thus without requiring the operator to reestablish that the target is a legitimate target.

Regardless of the pre-COMMIT activities, in the situations described above there are a number of possibilities regarding the relative positions of the aircraft and target prior to a pre-COMMIT function. First, the aircraft can be approaching the target on a linear or curving profile, such that the necessary turn angle (i.e., the angle between the present velocity and the final approach angle) is under 90°. This may also be because the aircraft is on a curving flyby that has not yet achieved flight normal to the radial vector from the target. Second, the aircraft can be circumnavigating the target, such that the necessary turn angle (i.e., the angle between the present velocity and the final approach angle) is likely to be (though not necessarily be) close to 90°. Thirdly, the aircraft can be receding from the target, such that the necessary turn angle (i.e., the angle between the present velocity and the final approach angle) is greater than 90°.

Commit Function Operational Variations

In a first operational variation, the operator may select the use of the prior art outbound-and-inbound maneuver. In this operational variation, the operator must reestablish PID on the target once it is flying directly toward the target, and therefore establish the legitimacy of the target. In other operational variations, the operator may select one of a variety of maneuvers that allow for a PID of the target to be maintained throughout the maneuver. The phrase "PID operational variations" is to be defined as operational variations that allow for a PID of the target to be maintained throughout the maneuver so long as an obstruction does not interfere with PID.

Figure 16:
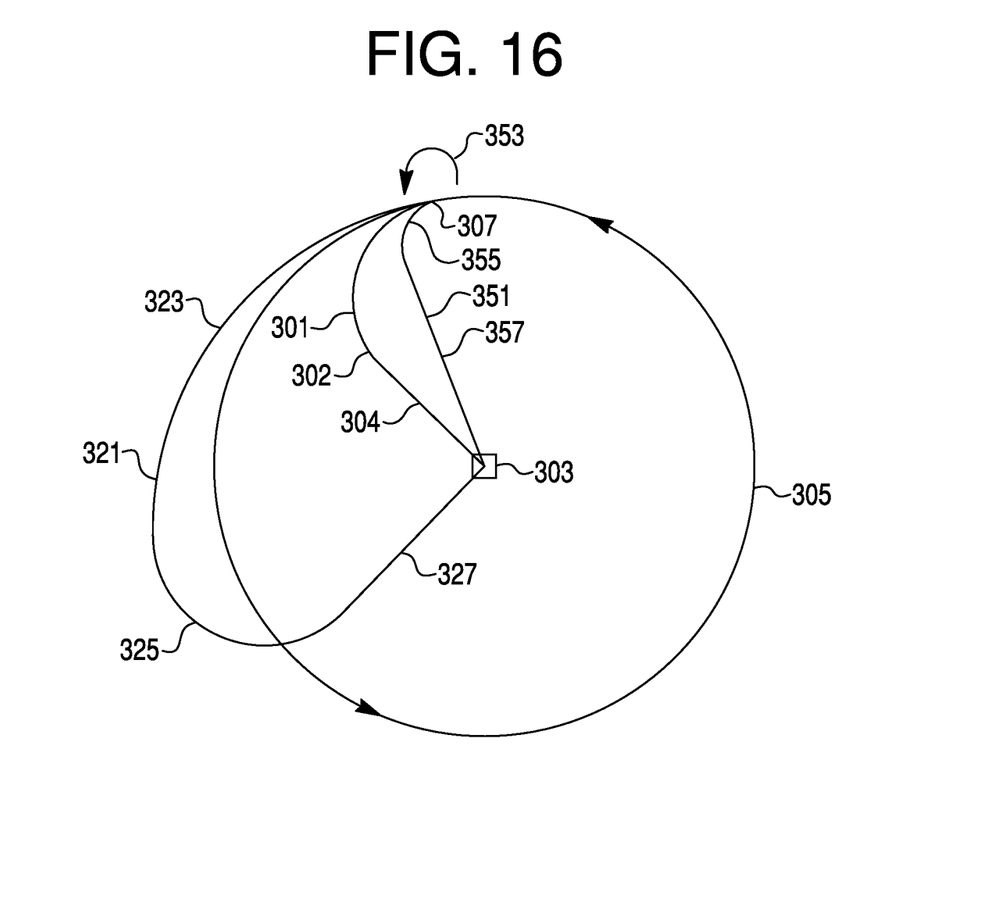
FIG. 16 is an aerial view depiction of three different PID operational variations.

With reference to FIGS. 16 and 11, a first PID operational variation 301 is the use of a coordinated turn 302 (i.e., a turn with all control surfaces coordinated to prevent any aircraft side-slip) to turn the aircraft toward a target 303, such as from a loiter pattern 305. More particularly, from a ground commit-location 307 the turn 302 is conducted and completed prior to entering a preferably straight final approach 309 on the target. During this maneuver, the yaw of the camera system must be continuously or periodically adjusted to keep the camera pointing toward the target. Because PID must be maintained, the aircraft roll angle is limited by the location of the target in the usable field of view. More particularly, the target cannot be allowed to drift past the top of the usable field of view.

An advantage of this first PID operational variation 301 is that it limits the time to reach the target, and the risk of detection. Limitations to the use of this PID operational variation include the possibility that the aircraft is to high to lose enough altitude before the ground location is reached (i.e., flying over the target instead of at the target). Another limitation is that if a certain length of time in straight flight final approach is desired, the aircraft it must have a wide enough loiter to complete the turn prior to entering the final approach.

A second PID operational variation 321 is a two part maneuver. In the first part 323, from the ground commit-location 307, the aircraft is directed to increase its distance from the target while maintaining PID. This can be done by flying past the target, by spiraling away from the target, or even by turning partially away from the target. In the second part 325, a coordinated turn is used to turn the aircraft back toward the target, and preferably into a straight final approach 327. During this maneuver, the yaw of the camera system must be continuously or periodically adjusted to keep the camera pointing toward the target. Because PID must be maintained, the aircraft roll angle (both in turning away from the target and toward the target) is limited by the location of the target in the usable field of view. More particularly, the target cannot be allowed to drift past the either the top or the bottom of the usable field of view.

An advantage of this second PID operational variation 321 is that it allows for more altitude loss prior to reaching the target, while limiting the time to reach the target as much as the altitude loss requirements will allow. Another advantage is that it may significantly lengthen the time spent in straight final approach 327. Thus, if PID is lost during the turning portions of the maneuver (such as due to turbulence or obstructions), more time is available to reestablish PID of the target.

A third PID operational variation 351 is also a two part maneuver. In the first part 353, at the ground commit-location 307, the aircraft is directed to sharply yaw so as to face the target, while maintaining PID. This will cause a significant slip and loss of lift, as the aircraft's flight vector will not change substantially, and it will not be flying in the direction it is facing. The pitch of the aircraft must be kept such that position of the target in the usable field of view is within the safe roll zone. With the target in front of the aircraft and in the safe roll zone, the aircraft can freely roll without loss of PID.

In the second part 355 of the maneuver, a significant roll is initiated to turn the aircraft flight vector toward the target. During this part of the maneuver, the yaw of the camera system will usually not need to be adjusted to keep the camera pointing toward the target. Because PID is not at risk when the aircraft rolls while facing the target, the aircraft roll angle is not limited by the location of the target in the usable field of view. Once the flight vector is directly toward the target, the aircraft roll angle is returned to zero and a straight final approach 357 is entered.

An advantage of this third PID operational variation 351 is that it may provide for a much sharper turn in the flight path than a coordinated turn that is limited in roll angle (the first PID operational variation 301). Also, the altitude may be reduced during both parts of the maneuver, and a longer final approach 357 may be obtained as compared to the first PID operational variation 301.

Limitations to the use of this third PID operational variation 351 include the fact that the aircraft control surfaces will only be able crab the aircraft (turn it in yaw) a certain amount, which will vary depending on factors such as the aerodynamics of the aircraft. It is likely that this crab limitation will be to angles no greater than 90°, and probably to a crab limitation significantly less than 90°. Thus, this PID operational variation might be most useful when the aircraft is flying partially toward the target (such as flying in a straight line toward an entry point to a circular loiter). Another limitation is that either or both parts of this maneuver could cause the aircraft to have partially or completely separated flow over the wing system. As a result, the control surfaces could lose effect, causing a loss of control over the aircraft. Therefore, this risk further limits the extent to which the maneuver can be conducted.

Additional PID operational variations may include combinations of portions of the aforementioned PID operational variations. For example, in a fourth PID operational variation if the aircraft is outside the crab limitation of the third PID operational variation 351 (e.g., it is in a circular loiter, or it is in a straight line flight passing the target), in a first part of a maneuver, the aircraft may be directed to start the coordinated turn of the first PID operational variations 301. Once the aircraft has turned toward the target enough to be within the crab limitation of the third PID operational variation, the aircraft is rolled to be level, and then the third PID operational variation is conducted. Optionally, the third PID operational variation yaw could be initiated without first rolling to level. It should be noted that this PID operational variation can be used even if the aircraft starts off within the crab limitation of the third PID operational variation.

Similar to this, in a fifth PID operational variation, if the aircraft is outside the crab limitation of the third PID operational variation 351, in a first part of a maneuver, the aircraft may be directed to start the coordinated turns of the second PID operational variation 321. Once the aircraft has turned toward the target enough to be within the crab limitation of the third PID operational variation, the aircraft is rolled to be level, and then the third PID operational variation is conducted. Optionally, the third PID operational variation yaw could be initiated without first rolling to level. It should be noted that this PID operational variation can also be used even if the aircraft starts off within the crab limitation of the third PID operational variation.

It should be noted that additional operational variations may include variants of the PID operational variations that are programmed for use near visual obstacles. In these additional operational variations, the automated control system can be programmed to mimic any one of the PID operational variations, and continue to fly the maneuvers even when the view is obstructed by the visual obstacle. Once the obstacle is passed, the view of the target is reestablished, and the operator must reestablish PID, i.e., establishing that the target is legitimate.

It is to be understood that the invention comprises apparatus and methods for designing aircrafts and for producing aircrafts, as well as the apparatus and methods of the aircraft itself. In short, the above disclosed features can be combined in a wide variety of configurations within the anticipated scope of the invention.

While particular forms of the invention have been illustrated and described, it will be apparent that various modifications can be made without departing from the spirit and scope of the invention. Thus, although the invention has been described in detail with reference only to the preferred embodiments, those having ordinary skill in the art will appreciate that various modifications can be made without departing from the scope of the invention. Accordingly, the invention is not intended to be limited by the above discussion, and is defined with reference to the following claims.

What is claimed is:

1. An unmanned aircraft system including an aircraft, comprising:
 a wing system configured to carry the majority of the aircraft weight when in flight;
 a plurality of control surfaces configured to control aircraft pitch, aircraft roll and aircraft yaw in flight;
 a camera characterized by a field of view, the camera being mounted on a camera pod, wherein the camera pod is only provided with actuators that vary the orientation of the camera field of view in yaw, relative to the aircraft, between a directly forward-looking orientation and a directly side-looking orientation; and
 a control system programmed to control the control surfaces, and further programmed to control the camera pod to only change the camera orientation in yaw, relative to the aircraft;

wherein the control system is programmed with a commit function for use when the camera is observing an identified target that is not directly in front of the aircraft; and wherein the commit function controls the camera orientation in yaw such that the camera continuously maintains the identified target within its field of view.

2. An unmanned aircraft system including an aircraft, comprising:
a wing system configured to carry the majority of the aircraft weight when in flight;
a plurality of control surfaces configured to control aircraft pitch, aircraft roll and aircraft yaw in flight;
a camera characterized by a field of view, the camera being mounted on a camera pod, wherein the camera pod is only provided with actuators that vary the orientation of the camera field of view in a single rotational degree of freedom, relative to the aircraft, between a forward-looking orientation and a side-looking orientation; and
a control system programmed to control the control surfaces, and further programmed to control the camera pod to only change the camera position orientation in the single rotational degree of freedom relative to the aircraft;
wherein the control system is programmed with a commit function that controls the aircraft flight and the camera the single rotational degree of freedom to guide the aircraft toward the target when the target is not directly ahead of the aircraft and the camera is observing an identified target;
wherein the commit function controls the control surfaces such that they induce aircraft yaw that causes the identified target to be within the field of view of the camera with the camera in the forward-looking orientation when the aircraft is not flying directly toward the identified target; and
wherein the commit function controls the camera orientation in the single rotational degree of freedom such that the camera continuously maintains the identified target within its field of view.

3. The unmanned aircraft system of claim 1, wherein the commit function further controls the control surfaces such that they induce an aircraft roll that causes the identified target to be within the field of view of the camera with the camera not being in the forward-looking orientation and with the aircraft not flying directly toward the identified target.

4. The unmanned aircraft system of claim 1, wherein the camera pod actuators can vary the orientation of the camera field of view, relative to the aircraft, between an orientation 45 degrees aft of a side-looking orientation and a forward-looking orientation.

5. The unmanned aircraft system of claim 2, wherein the commit function further controls the control surfaces such that they induce an aircraft roll that causes the identified target to be within the field of view of the camera with the camera not being in the forward-looking orientation and with the aircraft not flying directly toward the identified target.

6. The unmanned aircraft system of claim 2, wherein the camera pod actuators can vary the orientation of the camera field of view, relative to the aircraft, between an orientation 45 degrees aft of a side-looking orientation and a forward-looking orientation.

7. The unmanned aircraft system of claim 2, wherein the single rotational degree of freedom is a rotation in yaw.

* * * * *